United States Patent [19]

Tsunemoto et al.

[11] 4,043,726
[45] Aug. 23, 1977

[54] HOT RUNNER TYPE MOLD

[75] Inventors: Shiro Tsunemoto, Edosaki; Teruki Mizuguchi; Eiichi Hirayama, both of Azuma, all of Japan

[73] Assignee: Fuji Plastic Co. Ltd., Japan

[21] Appl. No.: 598,200

[22] Filed: July 23, 1975

[30] Foreign Application Priority Data

May 21, 1975 Japan ................................ 50-60632

[51] Int. Cl.² .............................................. B29F 1/03
[52] U.S. Cl. .................................... 425/563; 425/542
[58] Field of Search .................. 425/242 R, 243, 244, 425/245 R, 247, 248, 250, 245 NS; 222/496; 138/45, 177, DIG. 11

[56] References Cited

U.S. PATENT DOCUMENTS

| 3,491,408 | 1/1970 | Natkins | 425/245 NS X |
|---|---|---|---|
| 3,677,682 | 7/1972 | Putkowski | 425/243 |
| 3,719,310 | 3/1973 | Hunten | 425/245 R |
| 3,807,924 | 4/1974 | Mingotti | 425/245 R |
| 3,867,080 | 2/1975 | Bruder | 425/243 |

FOREIGN PATENT DOCUMENTS

| 2,035,159 | 2/1971 | Germany | 425/243 |

Primary Examiner—Robert D. Baldwin
Attorney, Agent, or Firm—George J. Neilan

[57] ABSTRACT

A hot runner mold provided with a runner pipe instead of a runner block wherein the walls of both end portions of the runner pipe are formed progressively thinner toward the tip of both end portions so as to cause the inner diameter of the walls to approximate to the outer diameter. One end portion of the runner pipe is made engageable with a hole formed in one side wall of a nozzle assembly and the other end portion is made engageable with a hole bored in a sprue bush. The runner pipe is laid between the nozzle assembly and sprue bush in a state inserted at both ends into said holes with a clearance provided therein in the axial directon of the runner pipe. Upon application of injection pressure, the thin walls of both end portions of the runner pipe expand outward in the radial direction for tight attachment to the inner walls of the holes, thereby presenting a sealing effect. The thermal deformation of the runner pipe in the axial direction is absorbed in the abovementioned clearances provided in the holes, thereby preventing heat transfer from the runner pipe to other mold parts than the nozzle assembly and sprue bush.

12 Claims, 10 Drawing Figures

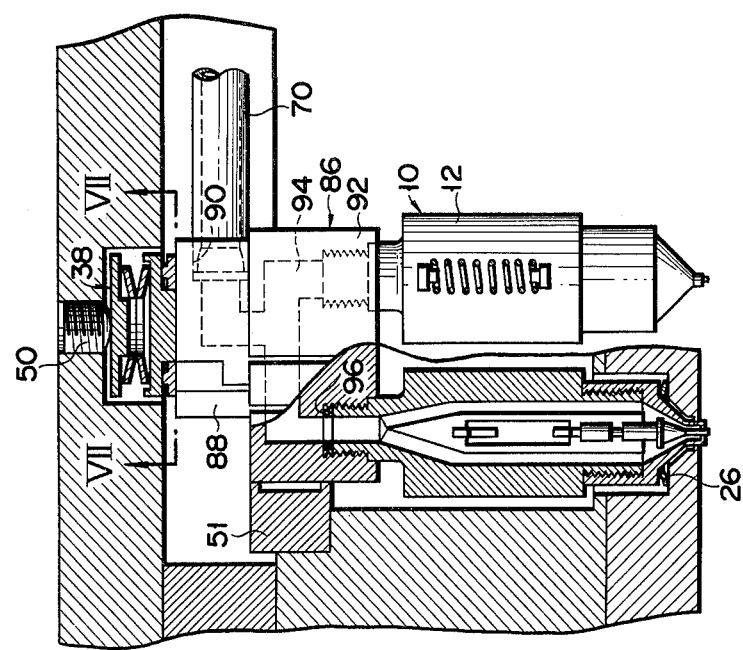
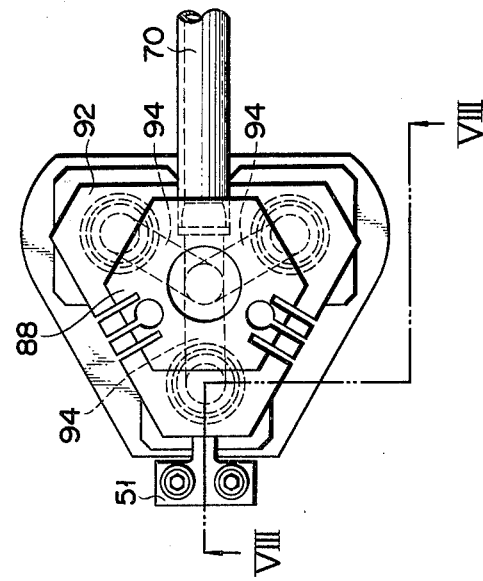

HOT RUNNER TYPE MOLD

BACKGROUND OF THE INVENTION

This invention relates to a hot runner mold for runnerless molding.

In the injection molding, a fluid passageway such as a runner or sprue has hitherto been mechanically designed to conduct molten plastics mass into a mold. Each time a plastics product is molded, it is taken out in a state accompanied with unnecessary mass or refuse left in said fluid passageway. An attempt to regenerate such runner refuse would lead to economic disadvantages and deteriorate the quality of a resultant product. Therefore, the runner refuse has been simply wasted, resulting in the loss of raw plastics material and, in an extreme case, acting as a source of public nuisance. Further, manufacture of a plastics product with unnecessary runner refuse attached thereto prolongs the cyclic period of molding and requires aftertreatment, thus obstructing the saving of work.

To date, therefore, various types of molds have been devised. Particularly in recent years, numerous types of hot runner mold have been developed.

With the conventional hot runner mold, a spacer is arranged between a fixed head die plate and fixed die block to provide a free space, in which a hot runner block is received. The runner block is bored with a runner hole and heated by a heater so as to maintain plastics material passing through the runner hole in a molten state throughout the cyclic period of injection molding.

However, the known hot runner mold used a large runner block, prolonging the time required for the runner block to be heated to a prescribed temperature, making it necessary to apply a large capacity heater, rendering a mold itself bulky and presetting difficulties in applying uniform heating to the runner block and controlling the temperature thereof. It has been difficult to construct such mold as suppresses heat transfer from the runner block to other mold parts and also to an injection molding machine and prevents its own deformation resulting from thermal stresses applied thereto.

SUMMARY OF THE INVENTION

It is accordingly the object of this invention to provide a compact inexpensive hot runner mold which is free from the above-mentioned drawbacks accompanying the prior art hot runner mold and prevents heat transfer throughout the mold and its thermal deformation.

In a hot runner mold according to the preferred embodiments of this invention, therefore, a hole is formed in the side wall of a nozzle assembly and also in the facing side of a sprue bush and a runner pipe made of material having good heat conductivity is inserted at both ends into said holes. The runner pipe is made progressively thinner toward the tip of both end portions so as to cause the inner diameter to approximate the outer diameter, and is inserted at both ends into the horizontal holes with a clearance provided therein in the axial direction of the runner pipe.

Substitution of a runner pipe for the conventional hot runner block can render a mold itself compact and admits of its inexpensive manufacture. Moreover, the runner pipe of this invention which is made of material having good heat conductivity such as beryllium-copper alloy fully absorbs heat transmitted from the sprue bush and is easily heated to a required temperature without using a heater of its own. Further, with the runner pipe of this invention, application of uniform heating and control of temperature can be easily attained, enabling molten plastics mass to flow at a constant rate. The walls of the subject runner pipe are made progressively thinner toward the tip of both end portions. These thinner wall portions expand outward in the radial direction when the mold is impressed with injection pressure and are tightly pressed against the inner walls of the aforesaid holes, presenting a sealing effect. Since both end portions of the runner pipe are inserted into the holes with a clearance provided therein in the axial direction of the runner pipe, its axial thermal deformation is fully absorbed by said clearances. Moreover, the runner pipe is positioned between the sprue bush and nozzle assembly, fully suppressing heat transfer from the runner pipe to other mold parts.

According to this invention, molten plastics material is introduced horizontally into the nozzle assembly through the runner pipe of the above-mentioned construction, thus facilitating the manufacture of a multigate type mold in which a plurality of cavity plates are formed in vertical symmetry.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWING

FIGS. 7 and 8 jointly illustrate a multigate type mold according to still another embodiment of the invention; FIG. 7 is a plan view of the multigate type mold as observed in the direction indicated by the arrows VII of FIG. 8 and FIG. 8 is a front view, partly in section, of the same as observed in the direction indicated by the arrows VIII of FIG. 7;

DETAILED DESCRIPTION OF THE PREFERRED EMBODIMENTS

Figure 1:
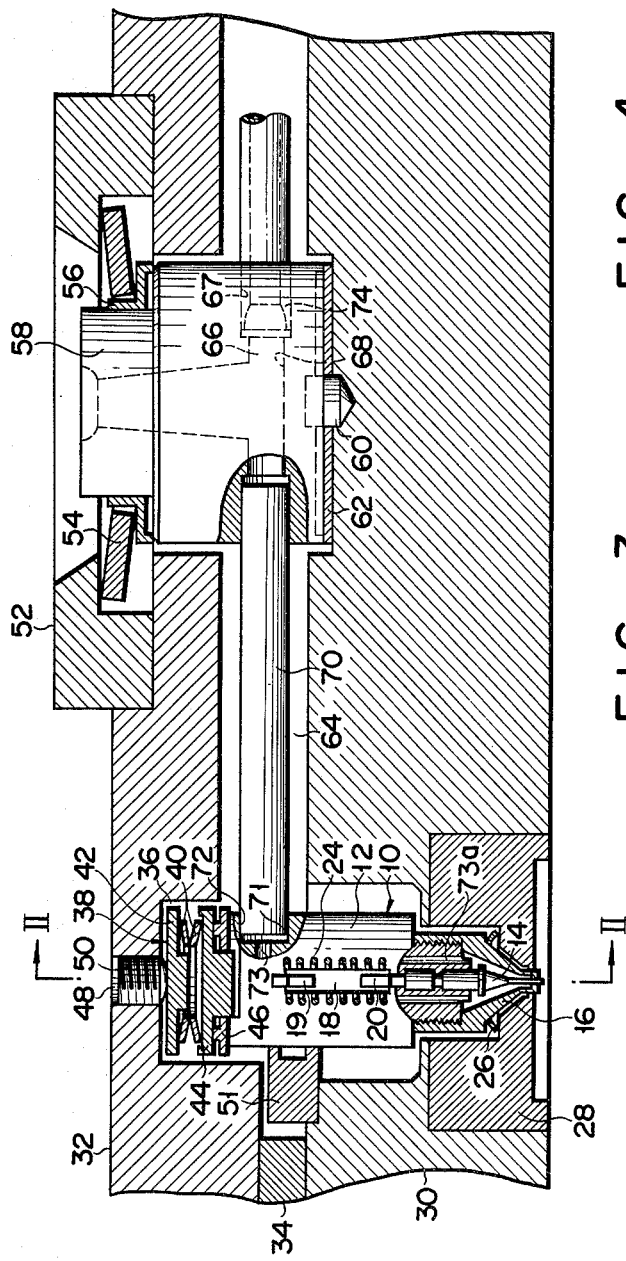
FIG. 1 is a longitudinal sectional view, partly broken away, of a hot runner mold according to an embodiment of this invention.
Figure 2:
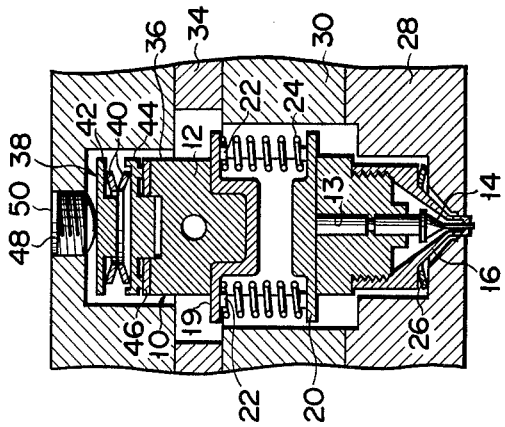
FIG. 2 is a sectional view on line II—II of FIG. 1.

There will now be described the preferred embodiments of this invention by reference to the appended drawings. As illustrated in FIGS. 1 and 2, a nozzle assembly 10 comprises a nozzle body 12, a nozzle pin 14 slidably inserted into a hole 13 (FIG. 2) bored axially of the nozzle body 12 and a nozzle cap 16 screwed into the nozzle body 12 so as to surround the nozzle pin 14.

Obviously, the nozzle assembly 10 is maintained at a prescribed temperature by a heater (not shown) and a temperature senser (not shown). Both side walls of the nozzle body 12 are bored with a pair of mutually facing elongate holes 18 extending in the axial direction of the nozzle body 12. A spring holder 19 provided with projections 22 is disposed in the upper portion of said paired elongate holes 18 so as to vertically slide therethrough. A spring holder 20 similarly provided with projections 22 is positioned in the lower portion of said paired elongate holes 18 so as to vertically slide therethrough. Both spring holders 19, 20 extend fully across said paired elongate holes 18. A pair of compression springs 24 are securely held by the projections 22 formed on said spring holders 19, 20 so as to be stretched therebetween in parallel. The nozzle pin 14 is pressed at one end against the underside of the lower spring holder 20. Where injection pressure is applied, the nozzle pin 14 slides through the hole 13 bored in the nozzle body 12 to push up the spring holder 20 against the biasing force of the paired compression springs 24, thereby opening the gate of the subject hot runner mold and allowing molten plastics material to be injected into the cavity of said mold. A heat insulating washer 26 is provided between the nozzle cap 16 and cavity plate 28 to obstruct heat transfer from the nozzle assembly 10 to the cavity plate 28. This cavity plate 28 is of the bush type.

Referential numerals 30, 32 denote a fixed die block and fixed head die plate respectively. A spacer 34 is interposed therebetween.

An opening 36 for receiving a buffer mechanism 38 is bored in one side wall or the underside of the fixed head die plate 32 which faces the fixed die block 30. The buffer mechanism 38 provides biasing members such as a pair of dish springs 40 which are not only repeatedly subjected to a dynamic load at the time of injection, but also are designed to absorb the axial extension of the nozzle assembly 10, and a keep plate 42 and a cradle 44 which cooperate to clamp said paired dish springs 40 therebetween. According to the embodiment of FIG. 1, the paired dish springs 40 are arranged in series so as to be prominently displaced. A heat insulating washer 46 is disposed between the cradle 44 and nozzle body 12 to obstruct heat transfer from the nozzle body 12 to other mold parts. The upper surface of the fixed head die plate 32 is bored with a threaded hole 48 communicating with the opening 36 for receiving the buffer mechanism 38. A push screw 50 is threadedly fitted into the threaded hole 48 to abut against the keep plate 42. The buffer force of the paired dish springs 40 is controlled according to the condition of the above-mentioned screw engagement. Referential numeral 51 denotes a locating member for defining the horizontal position of the nozzle body 12 and fixed to the die block 30 by bolts (not shown).

A locate ring 52 is fixed to the head die plate 32 by bolts (not shown). This locate ring 52 holds a sprue bush 58 by means of a disk spring 54 and a cradle 56 corresponding thereto. The sprue bush 58 abutting against the nozzle of the injection molding machine is heated by a heater (not shown) and the molten condition of plastics material is observed by a temperature sensor (not shown). The sprue bush 58 is set in position relative to the die block 30 by a locating pin 60. A heat insulating washer 62 is inserted between the sprue bush 58 and die block 30.

That side of the sprue bush 58 which faces a space 64 allowed between the die block 30 and head die plate 32 is bored with a horizontal hole 66, which may take, as indicated in broken lines in FIG. 1, a stepped form consisting of a larger diameter section 67 and a smaller diameter section 68. One end of a runner pipe 70 made of material having good heat conductivity such as beryllium-copper alloy is inserted into the larger diameter section 67 of the horizontal hole 66 with a clearance allowed therein in the axial direction of said runner pipe 70. The opposite end of the runner pipe 70 is inserted into a horizontal hole 71 bored in the side wall of the nozzle body 12 with a clearance provided therein in the axial direction of the runner pipe 70. This horizontal hole 71 may take a stepped form consisting of a larger diameter section 72 and a smaller diameter section 73, like the aforesaid hole 66.

Figure 3:
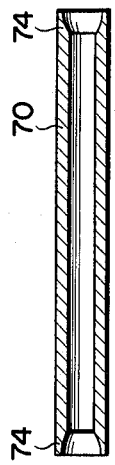
FIG. 3 is a longitudinal sectional view of the runner pipe used in the embodiment of FIG. 1.

The walls of both end portions 74 of the runner pipe 70 are machined, as shown in FIG. 3, have a concave curvature and are progressively thinner toward the tip so as to cause the inner diameter to approximate the outer diameter. The runner pipe 70 of good heat conductivity constructed as described above and inserted at both ends into the larger diameter section 67 of the sprue bush hole 66 and the larger diameter section 72 of the nozzle body hole 71 respectively with a clearance allowed therein in the axial direction of the runner pipe 70 is heated to a sufficiently high temperature by heat transmitted from the nozzle assembly 10 and sprue bush 58 to maintain charged plastics material in a molten state, and has its axial expansion well absorbed by said clearances. Where injection pressure is applied, both thin wall portions 74 expand outward in the radial direction to be tightly attached to the inner walls of the holes 66, 71, thereby preventing the leakage of molten plastics material from the runner pipe 70. Therefore, the runner pipe 70 of this invention not only eliminates the necessity of providing a heater and sealing device which might otherwise have to be used, but also easily obstructs heat transfer from the runner pipe 70 to other mold parts.

The molten plastic from runner pipe 70 flows into the small diameter hold 73 and from there through passageways 73a in the nozzle body 12 into the cavity around nozzle pin 14 and then into the mold cavity upon retraction of nozzle pin 14 against the bias of the springs 24.

Since molten plastics material is made to flow into the nozzle in the horizontal direction of the nozzle assembly 10, many advantages are offered of forming a vertical space admitting of free application, easily designing the construction of a mold adapted to absorb the axial thermal deformation of the nozzle assembly 10 and repeated dynamic load in injection molding, and also facilitating the design of a multigate type mold in which cavity plates are placed in vertical symmetry.

Further, this invention can fully prevent the damage of a mold (generally, the breakage of runner block supports such as bolts) which has hitherto been caused by the thermal deformation of a runner block used in the prior art hot runner type runnerless mold.

Though the runner pipe 70 of this invention should preferably be formed of material having good heat conductivity such as beryllium-copper alloy, yet any other material may be adopted, provided it enables charged plastics material to be maintained in a molten state without solidification in the resultant runner pipe.

Figure 4:
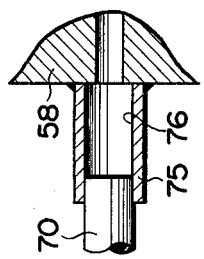
FIG. 4 is a fractional longitudinal sectional view of the runner pipe of this invention inserted into the fitting sections of a sprue bush.

FIG. 4 shows another embodiment where the runner pipe 70 is fitted to the sprue bush 58 through a fitting member 75 welded to the sprue bush 58 instead of boring a runner pipe engagement hole 66 in the sprue bush 58. This fitting member 75 may be screwed to the sprue bush 58 instead of being welded thereto or formed as an integral part of the sprue bush 58. Application of said fitting member 75 admits of adoption of a runner pipe 70 of the same length even for molds in which the sprue bush 58 and nozzle assembly 10 are spaced at different intervals, offering the advantage of not only eliminating the necessity of keeping runner pipes of varying lengths in stock but also rendering the nozzle body 12 compact.

Figure 5:
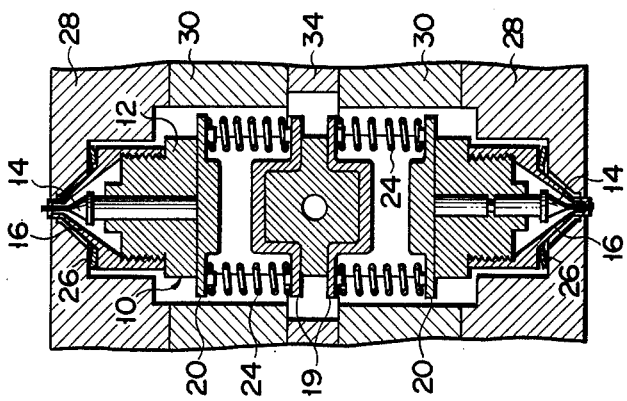

FIG. 5 illustrates a multigate type hot runner mold in which a pair of cavity plates 28 are placed in vertical symmetry. The parts of FIG. 5 the same as those of FIG. 2 are denoted by the same numerals. With a hot runner mold of such symmetrical form as shown in FIG. 5, spring holders 19, 20, and compression springs 24 are positioned in vertical symmetry with respect to the runner pipe 70. So are the nozzle pins 14, nozzle caps 16 and heat insulating washers 26. However, only one nozzle body 12 is required by forming the slide hole 13 in vertical symmetry. While cavity plates 28 and fixed die blocks 30 are also disposed in vertical symmetry, the buffer mechanism 38 is not provided. With a hot runner mold of this symmetrical form, a dynamic load in injection is applied inward at the same time and with the same magnitude so as to offset the mutual effect. The axial thermal deformation of the runner pipe 70 is absorbed by the heat insulating washers 26. These heat insulating washers 26 are so constructed as to admit of axial displacement like, for example, spring washers, in order to absorb the axial thermal deformation of the runner pipe 70 and hold the nozzle assembly 10 exactly in its prescribed position. The heat insulating washers 26 not only have a heat insulating effect like other heat insulating washers 46, 62 but also have a displacement-absorbing effect unlike the latter washers.

Figure 6:
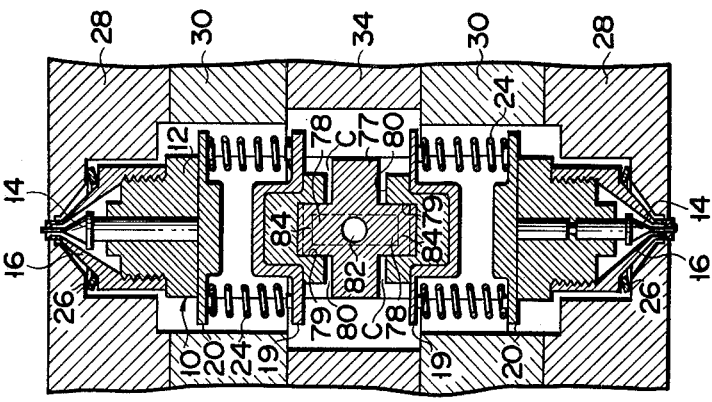
FIGS. 5 and 6 are sectional views similar to FIG. 2, showing multistage type hot runner molds according to another embodiment of the invention.

FIG. 6 indicates another hot runner mold similar to FIG. 5. The parts of FIG. 6 the same as those of FIG. 2 are denoted by the same numerals. In the embodiment of FIG. 6, unlike that of FIG. 5, the nozzle assembly 10 has a nozzle bush 77. The nozzle bodies 12, nozzle pins 14 and nozzle caps 16 are placed in vertical symmetry with respect to the nozzle bush 77. This nozzle bush 77 takes a cylindrical form provided with a pair of cylindrical projections 78 extending outward in the opposite directions. Each projection 78 is inserted into a hole 79 bored in the inner end portion 80 of the corresponding nozzle body 12. Like the walls of both end portions 74 of the runner pipe 70, those of the end portions of the upper and lower branch passageways of the nozzle bush 77 should preferably be machined progressively thinner toward the tip. If the nozzle bush 77 is not pressed against the inner end portion 80 of each nozzle body 12, but a gap C is defined therebetween, then the damage of the runner pipe 70 caused by the axial thermal deformation of the nozzle assembly 10 and nozzle bush 77 can desirably be prevented by the heat insulating washer 26 and said gap C.

FIGS. 7 and 8 jointly present the hot runner mold of FIG. 2 modified into a multigate type. With a 3-gate hot runner mold, the nozzle assembly 10 has a nozzle runner 86. This nozzle runner 86 provides a nozzle bush 88 bored with a hole 90 for receiving one end portion of the runner pipe 70 and a gate runner 92 in which three branch passageways 94 are provided to conduct molten plastics material from the runner pipe 70. Said nozzle bush 88 and gate runner 92 are formed integrally with the nozzle runner 86. Each of the three nozzle bodies 12 is inserted at one end into a screw socket formed in the end portion of the corresponding passageway 94, and fitted at the tip with an O-ring 96 to prevent the leakage of molten plastics material. The overall axial thermal deformation of each nozzle body 12 and nozzle runner 86 is absorbed by the corresponding buffer mechanism 38 and heat insulating washer 26.

Figure 9:
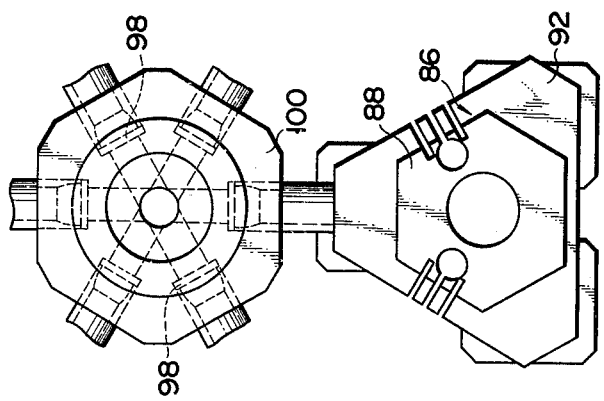
FIG. 9 is a plan view, partly in section, of a multigate type mold according to still another embodiment of the invention where six nozzle runners are provided.

FIG. 9 illustrates another type of multigate type hot runner mold provided with a plurality of (for example, six) nozzle runners 86. Each nozzle runner 86 has three gates. The 18-gate type hot runner mold shown in FIG. 9 has a common sprue bush 100 bored with the same number of runner pipe engagement holes 98 as the nozzle runners 86.

Figure 10:
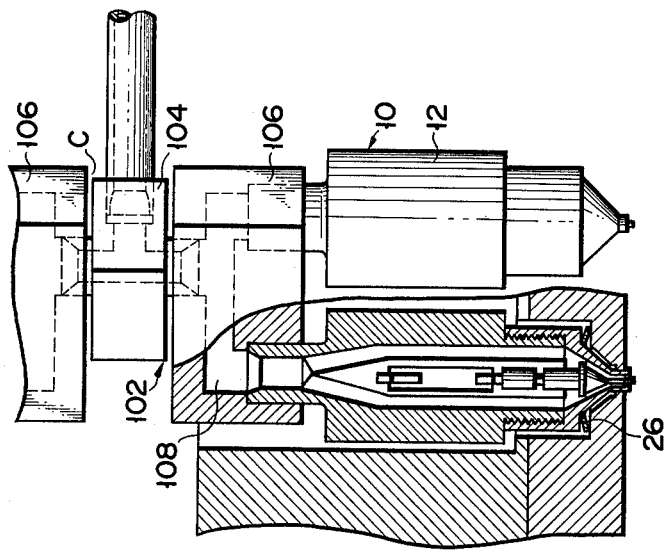
FIG. 10 is a front view similar to FIG. 8, showing a multigate type mold according to a further embodiment of the invention.

FIG. 10 sets forth a multigate type hot runner mold corresponding to the hot runner mold of FIG. 6. With the embodiment of FIG. 10, a nozzle runner 102 has two gate runners 106 disposed above the nozzle bush 104 with a gap C allowed between each gate runner 106 and nozzle bush 104. The axial thermal deformation of the nozzle body 12 and nozzle bush 104 is absorbed by the heat insulating washer 26 and said gap C. The wall of that part of the nozzle body 12 which is fitted to the nozzle bush 104 is made thin for insertion into the end portion of the passageway 108, eliminating the necessity of providing an O-ring. According to the embodiment of FIG. 10, the nozzle body 12 is set in place by being fitted into the gate runner 106.

As mentioned above, this invention adopting a runner pipe in place of a hot runner block offers many advantages of, for example, providing a compact, light weight damage-free hot runner mold capable of easily attaining uniform heating and absorption of thermal deformation of the runner pipe and other mold parts and facilitating the manufacture of a multigate type hot runner mold.

All the foregoing embodiments are simply intended to describe the objects and novel features of this invention. It is to be expressly understood, however, that this invention is not limited to said embodiments but includes any other modifications and substitutions falling within the technical concept and scope of the invention.

We claim:

1. A hot runner mold which comprises a nozzle assembly having a nozzle body supported floatingly between a fixed head die plate and a cavity plate and bored with a horizontal hole, a heat insulating spring washer provided between the nozzle assembly and the cavity plate and serving to prevent heat transmission from the nozzle assembly to the cavity plate and to absorb thermal deformation of the nozzle assembly in its axial direction, a sprue bush provided with a horizontal hole aligned with the horizontal hole of the nozzle body, a buffer mechanism provided at the opposite end of said nozzle assembly from said heat insulating spring washer and serving to floatingly support the nozzle body and to absorb a repeated load during an injection operation in cooperation with said heat insulating spring washer, and a straight runner pipe made of material having good heat conductivity and slidably fitted in the horizontal holes, the runner pipe having its inside surface concavely curved at both end portions such that the end portions are progressively thinner toward the tips so as to cause the inner diameter of the tips to approximate the outer diameter thereof whereby the end portions expand in the radial direction into tight sealing engagement with the walls of the horizontal holes.

2. The hot runner mold according to claim 1, which further comprises a biasing mechanism including a pair of holders axially slidable through elongated holes bored in the mutually facing side walls of the nozzle body, a nozzle pin slidable within the nozzle body in its axial direction being fixed to the holder on the side of the cavity plate, and a pair of compression coil springs disposed between the opposed and outwardly extending ends of the holders so as to be compressed therebetween.

3. The hot runner mold according to claim 2, wherein the opposed and outwardly extending ends of the holders are each provided with a projection to permit the springs to be set in place.

4. The hot runner mold according to claim 2, wherein said buffer mechanism is received in an opening which is bored into the underside of the fixed head die plate facing the upper surface of the nozzle body.

5. The hot runner mold according to claim 4, wherein the buffer mechanism includes a buffer member generating a variable buffering force, and a keep plate and a cradle which are so disposed as to hold the buffer member therebetween.

6. The hot runner mold according to claim 5, wherein the buffer member has a pair of dish springs disposed to be mutually facing.

7. The hot runner mold according to claim 6, which further comprises a screw fitted into a threaded hole bored in the fixed head die plate so as to externally vary the buffering force of the buffer member.

8. The hot runner mold according to claim 1, wherein the nozzle assembly includes a nozzle bush bored with horizontal hole into which the runner pipe is inserted, and two nozzle bodies disposed symmetrically with respect to the nozzle bush, the nozzle bush being provided with a plurality of branch passageways which communicate with the horizontal hole and the walls of which are made progressively thinner toward the tip of the open end portion.

9. The hot runner mold according to claim 8, which further comprises two biasing mechanisms each including a pair of holders axially slidable through elongated holes bored in the mutually facing side walls of the nozzle body, a nozzle pin slidable within the nozzle body in its axial direction being fixed to the holder on the side of the cavity plate, and a pair of compression coil springs disposed between opposed and outwardly extending ends of the holders so as to be compressed therebetween.

10. The hot runner mold according to claim 1, wherein the nozzle assembly further comprises a nozzle runner provided with a gate runner, a plurality of nozzle bodies are fitted to said gate runner, and a nozzle bush bored with a runner pipe engagement hole.

11. The hot runner mold according to claim 10, wherein the gate runner and nozzle bush of the nozzle runner are integrally formed.

12. The hot runner mold according to claim 10, wherein a clearance is provided between said nozzle bush and said gate runner.

* * * * *